A. Bauerschmitt,
Bridle,

N° 79,628. Patented July 7, 1868.

Witnesses
Geo Frauenberger
Geo Eichorn

Inventor
Adam Bauerschmitt

United States Patent Office.

ADAM BAUERSCHMITT, OF ROCHESTER, NEW YORK.

Letters Patent No. 79,628, dated July 7, 1868.

IMPROVED BRIDLE.

*The Schedule referred to in these Letters Patent and making part of the same.*

TO ALL WHOM IT MAY CONCERN:

Be it known that I, ADAM BAUERSCHMITT, of Rochester, county of Monroe, and State of New York, have invented a new and useful Improvement on Bridles; and I do hereby declare that the following is a full and exact description of the same, reference being had to the accompanying drawings, and to the letters of reference marked thereon, in which—

The nature of my invention consists in the construction and peculiar arrangement of a self-adjusting and safety-bridle, by which full control is secured over a hard-bitted horse, while at the same time the most tender-mouthed horse need not receive injury.

To enable others skilled in the art to make or use my invention, I will proceed to describe the construction and operation of the same.

Figure 1:
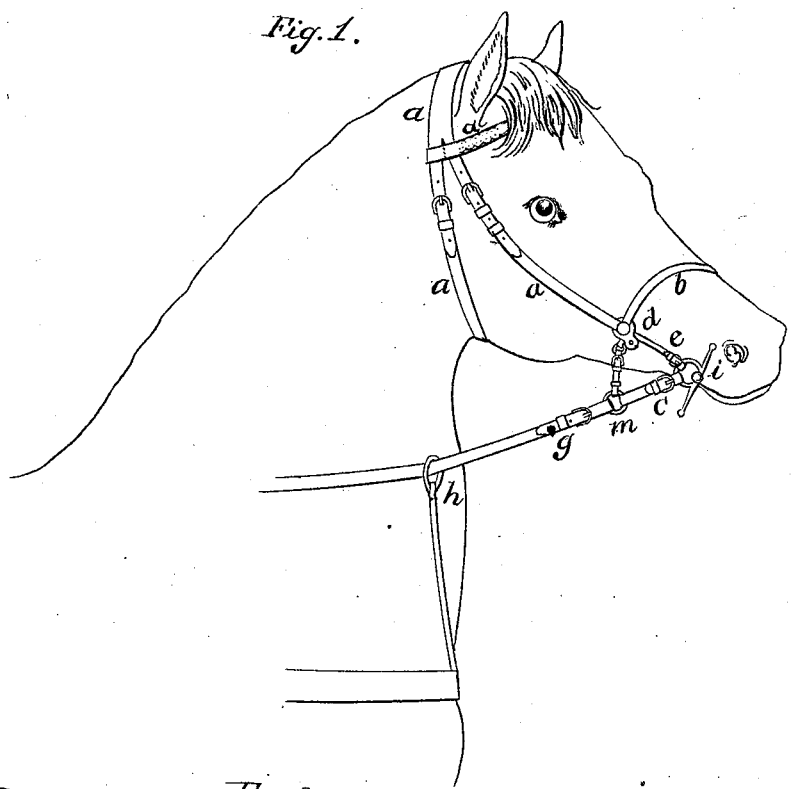
Figure 1 represents one side of my improved bridle on the horse.

The upper part of my bridle, or the parts marked $a\ a\ a$ in drawing, fig. 1, are the same as used in any common bridle. $b$ represents the nose-piece. $d$ is a pulley-ring. The cheek-piece $a$ and nose-piece $b$ are attached to the pulley-ring $d$ on both sides of the bridle. The bit $i$ is attached to the bridle by a short round, $e$, with buckle and billet on one end, and a small ring on the other end, the round part passing over a loose pulley, $d$. The ring on short round $e$ is to prevent the end of short round $e$ from slipping over the pulley $d$ when the short round acts as part of the cheek-piece of the bridle. $f$ represents a short strap, which connects the short round $e$ with the line $g$. The strap $f$ may be lengthened or shortened as becomes necessary.

Figure 2:
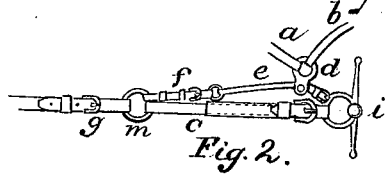
Figure 2 represents one side of bridle, the rein drawn back.
Figure 3:
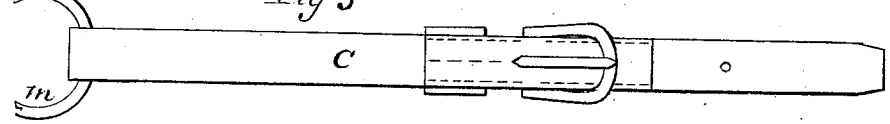
Figure 3 represents an India-rubber attachment, with buckle and billets.
Figure 4:
Figure 4 represents a side view of my India-rubber attachment, with buckle and billet.

$c$ represents an India-rubber strap, attached to a short leather strap with buckle and billet, as shown in drawing, figs. 3 and 4. The rubber strap $c$ connects the line $g$ with the bit $i$, and the most tender-bitted horse cannot receive injury by the use of my rubber strap or connection $c$, while at the same time full control is secured over the hard-bitted horse. By drawing hard on the reins, the rubber strap $c$ will stretch to the combined length of strap $f$ and short round $e$, and the bit $i$ is drawn back in the horse's mouth; also the nose-piece $b$ is drawn tight over the horse's nose, as fully shown in fig. 2 of accompanying drawing. The most furious horse may thus be brought to a stand-still in a moment, and with perfect safety, and as soon as the reins are slackened up, all parts of the bridle will adjust themselves to their proper places. The purchase on rubber strap C is regulated by the short strap $f$, by either lengthening or shortening the same, as it becomes necessary, for different horses.

By attaching the hitching-strap to the rings $m\ m$, the horse may be hitched with perfect safety. No matter which way he may pull, he will draw the bit $i$ back in his mouth.

What I claim as my invention, and desire to secure by Letters Patent, is—

The India-rubber strap $c$, short round $e$, short strap $f$, and pulley-ring $d$, when constructed and operated in connection with a bridle, as herein described and set forth.

ADAM BAUERSCHMITT.

Witnesses:
GEO. FRAUENBERGER,
GEO. EICHORN.